United States Patent Office 3,547,892  
Patented Dec. 15, 1970

3,547,892  
METHOD OF PREPARING POLYUREAS FROM AMINE SALTS OF MONOTHIOLCARBAMIC ACID AND AMMONIA OR PRIMARY AMINE  
Edward A. Swakon, Hammond, Ind., assignor to Standard Oil Company, Chicago, Ill., a corporation of Indiana  
No Drawing. Original application Mar. 27, 1964, Ser. No. 355,411, now Patent No. 3,392,197. Divided and this application Nov. 13, 1967, Ser. No. 682,630  
Int. Cl. C08g 22/02  
U.S. Cl. 260—77.5    2 Claims

ABSTRACT OF THE DISCLOSURE

Linear polyureas are prepared by reacting a diprimary-amine whose primary amino groups are separated by at least four carbon atoms with an N,N-dialkylammonium N,N-dialkyl monothiolcarbamate in the ratio of $n$ plus two moles or diprimaryamine for each $n$ mole of the ammonium monothiocarbamate. For example, linear poly-(decamethylene) urea can be prepared by reacting alpha-omega diamino decamethane with triethyl ammonium N,N-di-n-propyl monothiolcarbamate.

---

This application is a divisional application of copending Ser. No. 355,411 filed Mar. 27, 1964 which is now U.S. Pat. No. 3,392,197.

The method of this invention for preparing ureas by a low pressure technique employs as an essential reactant monothiolcarbamic acid or N-disubstituted monothiolcarbamic acids. Since many of these monothiolcarbamic acids are not stable or isolatable per se, the monothiolcarbamic acid is employed in the form of a salt. These salts are readily formed at ordinary temperature and pressure by the reaction of carbonyl sulfide or carbon monoxide and sulfur with a secondary amine.

In the American Gas Association Proceedings for 1947 it is disclosed in the "Report of Organic Sulfur Committee" at pages 591 to 602 that certain primary and secondary amines will remove carbonyl sulfide from gases through the formation of monothiolcarbamates. Little interest has been given to monothiolcarbamates as potential intermediates for, in general, carbonyl sulfide has not been produced or available in commercial quantities. The known methods for direct preparation of carbonyl sulfide from readily available carbon monoxide and sulfur were not feasible for commercialization. However, there has been developed commercially feasible processes for converting synthesis gas (mixtures of carbon monoxide and hydrogen) and other impure carbon monoxide gas sources to carbonyl sulfide at moderate temperatures and pressures. One of these processes can convert synthesis gas and sulfur to carbonyl sulfide and high purity hydrogen at moderate temperatures and pressures. As a modification thereof, the carbonyl sulfide is readily obtainable as a monothiolcarbamate rather than carbonyl sulfide per se. By the proper choice of amines, liquid or solid monothiolcarbamates can be obtained as a convenient storage of carbonyl sulfide (boiling point $-50°$ C.) at ambient temperature and pressure.

The aforementioned report in the American Gas Proceedings for 1947 suggests that certain primary amines undergo reaction with carbonyl sulfide to form substituted thioureas but the conditions of reaction to form thioureas are not given. Also reported was that di-butylamine and dicyclohexylamine reacted with carbonyl sulfide to produce liquid products while the other diamines used produced crystalline products having sharp melting points.

Urea is produced by the catalytic reaction of substantially pure carbon dioxide and ammonia at elevated temperature and pressure. The production of ureas through the reaction of a primary amine or ammonia with carbon monoxide and sulfur or sulfur compounds in the presence of alcohols has been recently reported. A new route to urea and N,N'-disubstituted ureas has been discovered which has advantages over the aforementioned routes. The new route to urea and sym. N,N-disubstituted ureas comprises reacting two equivalents of ammonia or a primary amine with one equivalent N,N-disubstituted monothiolcarbamic acid conveniently provided by a secondary amine or tertiary amine salt of N,N'-disubstituted monothiolcarbamic acid. The reaction involved in this new route is believed to take place as follows:

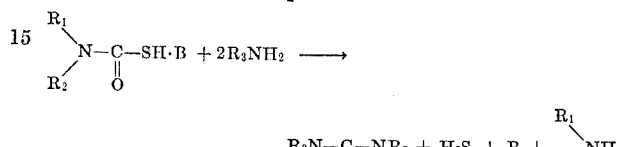

wherein $R_1$ and $R_2$ can be alike or different alkyl, aryl or heterocyclic groups, $R_3$ can be hydrogen or alkyl, aryl, heterocyclic or a $-R_4NH_2$ group wherein $R_4$ is a divalent group such as a divalent linear hydrocarbon group having 2 or more carbon atoms, a divalent cyclic (alicyclic or aryl) hydrocarbon or heterocyclic group, attached, of course, to two primary amino groups. $R_1$ and $R_2$ need not be two separate groups for they can be joined in a single group as in an N-heterocyclic group such as in piperidine, morpholine and others. When $R_1$ and/or $R_2$, as hereinbefore defined, contain groups reactant with ammonia and primary amines, sufficient additional ammonium and primary amine reactant should be supplied to compensate for the recognized side reactions. When $R_3$ is the $-R_4NH_2$ group, that is, when $R_3NH_2$ contains 2 primary amino ($-NH_2$) groups there is produced by the method of this invention cyclic ureas when the two primary amino groups are separated by 2 to 4 other, i.e. carbon or carbon and oxygen or carbon and nitrogen atoms and linear polyureas when the two primary amino groups are separated by four or more carbon or carbon and oxygen, carbon and nitrogen or carbon, nitrogen and oxygen atoms, etc. to prevent the formation of cyclic ureas.

The symbol B in the foregoing equation used to denote the salt former portion of the monothiolcarbamate desirably is a secondary or tertiary amine and preferably is the same secondary amine from which the N,N-disubstituted monothiolcarbamic acid was formed, e.g. by the reaction of carbonyl sulfide with two moles of secondary amine.

It will be noted that neither the

moiety of the monothiolcarbamic acid nor the B salt former enter into the urea product. Since the $R_1$-$R_2$-containing diamine and salt former B are by-products of the urea formation together with hydrogen sulfide and since the urea products are solids at temperatures of above $100°$ C. and secondary amines such as dimethyl, diethyl, di-n-propyl, diisopropyl, di-n-butyl, diisobutyl, diisoamyl are liquid or boil at temperatures in the range of 50 to $100°$ C., they can be readily removed from the urea product. Also solvents which selectively dissolve either the amine by-product or the urea product can be used as a means for separating product and by-product. The by-product hydrogen sulfide is tied up by ammonia reactant or amine reactant or by-product amine and can be removed by any known method.

The method of this invention can be conducted at temperatures above 50°C. up to about the decomposition temperature of the urea product. Urea can be conveniently prepared by reacting ammonia or ammonium hydroxide with the salt of N,N-disubstituted monothiolcarbamic acid at temperatures of from 90 to 130° C. At these temperatures dimethylamine (B.P. 7.4° C.), diethylamine (B.P. 56° C.), di-n-propylamine (B.P. 110.7° C.) and diisopropylamine (B.P. 84° C.) precursors of the N,N-disubstituted monothiolcarbamic acid and salt former B can be distilled away from urea (M.P. 132–33° C.) and such tertiary amine salt formers as triethylamine (B.P. 89.5° C.) can also be distilled away to also sweep out by-product $H_2S$. The secondary amine or mixture of secondary amine and tertiary amine so distilled away can be scrubber free of $H_2S$ and again reacted with carbonyl sulfide or carbon monoxide and sulfur.

The formation of cyclic ureas by the process of this invention can be illustrated by the reaction of dibutylamine salt of dibutylmonothiolcarbamic acid with ethylene diamine or o-phenylene diamine at 130 to 150° C. in an autoclave.

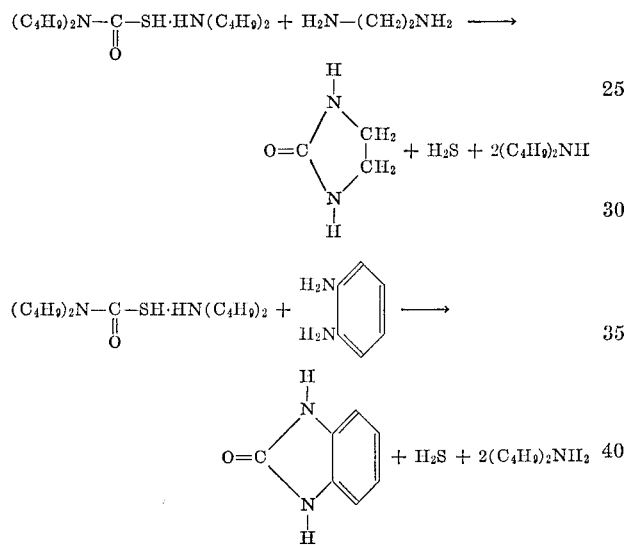

After reaction time of 1 to 3 hours the by-product $H_2S$ and dibutylamine can be vented and the cyclic amine recovered. Other diamines with less than 4 carbon atoms between the two primary amino groups such as 1,3-propylene diamine and 1,3-diaminobutane will produce cyclic ureas having six membered rings such as

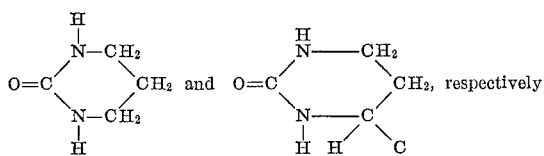

When the two primary amino groups are separated by 2 up to 4 carbon atoms there is favored the formation of a cyclic urea containing the bivalent

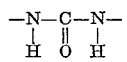

ureylene, group.

When the two primary amino groups are separated by linear or cyclic group containing four or more carbon atoms such as 1,4-diamino butane, 1,4- and 1,5-diamino pentanes, 1,4-, 1,5- and 1,6-diaminohexanes, 1,4- to 1,7-diaminoheptanes, 1,4- to 1,8-diamino-octanes, pentamethylene diamine, hexamethylene diamine, octamethylene diamine, decamethylene diamine, dodecamethylene diamine, 1,4-diaminocyclohexane, p-phenylene diamine, p,p'-diamino biphenyl, 2,6-naphthylene diamine, these diamines react in the process of this invention to produce precursors of high molecular weight linear polyureas useful as fiber-formng polymers. These linear polyureas of high molecular weight have been prepared by reacting carbonyl sulfide with the foregoing diamines to first form a prepolymer monothiolcarbamate which, upon further heating at a temperature above 150° C. and up to 230 to 240° C., is converted to high molecular weight linear polyurea with the liberation of $H_2S$. These reactions require first the formation of the monothiolcarbamate of the diamine at low temperatures or under reduced pressure. The new route of this invention can eliminate the low temperature and/or subatmospheric pressure reactions between carbonyl sulfide gas an linear diamine. For example, by reacting p-phenylene diamine with di-n-butyl amine salt of di-n-butyl monothiolcarbamic acid the following polyurea may be obtained:

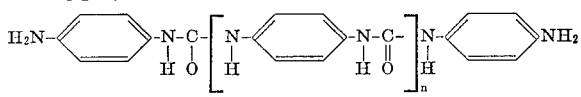

by the use of $n+2$ moles of p-phenylenediamine with $n$ moles of the monothiolcarbamate. Also by reacting $n+2$ moles of hexamethylenediamine with $n$ moles of a monothiolcarbamate of the class hereinbefore defined the following polyurea can be prepared

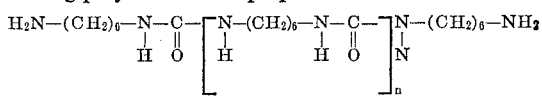

having a melting point of 195° C.

The primary amine, $R_3NH_2$, reactant hereinbefore defined can contain hydroxy group as in an amino alcohol such as ethanol amine, 2- and 3-hydroxypropyl amine and the like, or can contain an alkoxy-carboxy group such as esters of amino acids such as the methyl aminobenzoates, ethyl aminoacetate, methyl and propylaminopropionates, methylaminobutyrates and the like. From the reaction of an amino alcohol such as ethanol amine there can be obtained a urea having a second useful functional group as in

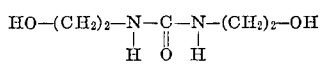

Also from esters of amino acids such as methyl p-aminobenzoate and methyl beta-aminopropionate there can be obtained:

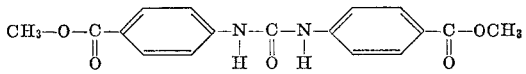

and

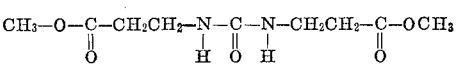

respectively.

Thus the $R_3NH_2$ primary amine reactant in addition to the aforementioned ammonia, amino alcohols, esters of amino acids and diamines include methylamine, ethylamine, n-propylamine, isopropylamine, n-butylamine, isobutylamine, sec. butylamine, t-butylamine, n-pentylamine, isoamylamine, sec. amylamine, t-amylamine, hexylamine, heptylamine, octylamine, decylamine, dodecylamine, and alkylamines up to $C_{20}$ alkylamines, cyclohexylamine, cyclopentylamine, 2-methylcyclopentylamine, 4-methylcyclohexylamine, benzylamine, phenethylamine, aniline, toluidines, xylidines, alpha-naphthylamine, beta-naphthylamine, mesidine, 1-fluorenamine, 2-furanamine, 2-p-dioxanamine, 3-gamma-phranylamine, xenylamine, 3-biphenylamine, furfurylamine, 1-naphthalene-methylamine, 1-indanethylamine, 2-aminopyrrole, 1-aminoacridine, and the like.

Preferred for the purposes of this invention are the monothiolcarbamates derived from dibutylamines, diamylamines, dihexylamines, diheptylamines and dioctylamines. These monothiolcarbamates can be readily obtained as liquid products by the reaction of carbonyl sulfide with two moles of secondary amine at temperatures below about 120° C., e.g. in the range of 25–100° C., at atmospheric pressure.

The reaction of the monothiolcarbamate with the primary amino reactant can be conveniently carried out at temperatures of up to but not exceeding about 120–130° C. and desirably at 25–100° C. Reactions of ammonia with the monothiolcarbamates are carried out under pressure to retain ammonia in the reaction system. In this case, the reaction pressure is substantially that of the vapor pressure of ammonia at the reaction temperature. The reaction between monothiolcarbamates and lower molecular weight primary amines which have an appreciable vapor pressure at reaction temperature 25–100° C. is also desirably carried out in a closed reaction under pressure to retain the volatile primary amine in the reaction system. However, reaction between the monothiolcarbamates and primary amines having relatively low or negligible vapor pressure at 25–100° C. can be carried out at atmospheric pressure.

A more complete understanding of the method of this invention can be had from the following illustrative examples.

EXAMPLE 1

The monothiolcarbamic acid reactant is prepared from 20 grams COS and 100 grams di-n-butylamine and charged to 300 ml. stainless steel autoclave. Thereafter, 20 ml. of ammonia at 150 p.s.i. is metered into the reactor from a Ruska pump. The reactor is heated at 90° C. for three hours. The reactor is depressurized. A liquid product containing yellow solids is recovered and recrystallized from n-propyl alcohol. Melting point of solid was 132–136° C. and showed no depression with a mixture of product and urea. The product, therefore, is urea.

EXAMPLE 2

The monothiolcarbamic acid reactant is prepared by adding 30 grams (0.5 mole) COS to 129 grams (1.0 mole) di-n-butylamine in a 3-neck flask equipped with stirrer. Thereafter, 98 grams (1.0 mole) cyclohexylamine is added to the resulting monothiolcarbamate solution. The reaction is exothermic. A solid product immediately forms and the reaction mixture is mixed with a spatula. 50 grams of this product is worked up by washing several times with hexane to produce a light yellow solid. By melting point determination, a part of the product melts at 140–150° C. and changes to yellow powder which melts at 220–222° C. Twenty-five grams of the solid (cyclohexylammonium thiocarbonate) was thermally decomposed to produce a brown greasy solid. A hexane wash of this material produced a yellow crystalline solid which melted at 235–237° C. Reported melting point of 1,3-dicyclohexylurea is 247° C.

EXAMPLE 3

Triethylamine N,N - diisopropylmonothiolcarbamate salt, obtained from the reaction of carbonyl sulfide with equimolecular portions of diisopropylamine and triethylamine, is reacted with methylamine in an autoclave at 90° C. for about three hours. The autoclave is then vented. Sym. dimethyl urea may be recovered by taking up the reaction product in hot ethanol, concentrating and cooling the resulting solution to precipitate sym. dimethyl urea.

EXAMPLE 4

Cyclic ethylene urea may be prepared by reacting equimolar proportions of triethylamine N,N-di-n-propylmonothiolcarbamate salt and ethylene diamine in an autoclave at 130° C. for about three hours. After venting the autoclave to remove di-n-propylamine, triethylamine and $H_2S$, the residue can be dissolved in a suitable solvent for cyclic ethylene urea which is then recrystallized as a purified product.

EXAMPLE 5

There are combined in an autoclave 2 moles triethyl ammonium N,N-di-n-propylmonothiolcarbamate (524 grams) and 4 moles decamethylene diamine (1088 grams). The autoclave is sealed and its contents are heated to 100° C. for about 3 hours. Thereafter the autoclave is vented with a nitrogen purge while heating its contents progressively to a temperature of about 230 to 240° C. over 20 to 30 hours to obtain the desired molecular weight. In this manner a linear poly(decamethylene urea) may be obtained.

Linear polyureas from p-phenylene diamine, hexamethylene diamine (M.P. of polymer 195° C.) and decamethylene diamine (polymer M.P. 235–240° C.) are known.

EXAMPLE 6

Sym. difurfuryl area may be prepared by reacting two moles furfurylamine with one mole of dibutylamine N,N-dibutylmonothiolcarbamate salt at 90° C. for 3 hours in a sealed reaction vessel. After venting the reaction vessel to atmospheric pressure, sym. difurfuryl urea may be recovered from the residue in the reactor by dissolving the residue in a suitable solvent and recrystallizing the urea product from solution.

EXAMPLE 7

Sym. diphenylurea may be prepared by reacting two moles of aniline with one mole of triethylamine N,N-di-n-propylmonothiolcarbamate salt in a sealed reaction vessel at about 90° C. After venting the reaction vessel to atmospheric pressure, the residue in the reactor is dissolved in dioxane and sym. diphenyl urea recovered by crystallization.

Rather than dissolving the urea product in a solvent for recovery of the urea product, the reaction residue can be extracted with a dilute acid such as dilute hydrochloric acid to take up the by-product amine leaving the urea as undissolved residue which can be recovered by means for separating solids from liquids as for example, filtration, decantation, centrifugation, etc. More specifically the process of Example 7 is repeated through venting of the reaction vessel. Thereafter dilute aqueous hydrochloric acid containing sufficient HCl to combine with the di-n-propylamine and triethylamine, about two moles HCl, is added with stirring. The resulting slurry is filtered to recover undissolved sym. N,N'-diphenyl urea as the filter cake.

The method of this invention as disclosed and illustrated hereinbefore produced symmetrical ureas including urea itself from ammonia and sym. N,N'-disubstituted urea.

What is claimed is:

1. A method of preparing a linear fiber-forming polyurea polymer which comprises reacting a diprimaryamine having a hydrocarbon group of at least four carbon atoms between the two primary amino griups with a N,N,N-triethyl-ammonium N,N-dialkyl monothiolcarbamate in the ratio of $n+2$ moles of said diprimary amine for each $n$ moles of said salt at a temperature of from 25 to 130° C. and heating the reaction mixture further to a temperature up to 240° C. to obtain the linear polyurea.

2. The method of claim 1 wherein the diamine is alpha-omega diamino decamethane and the ammonium monothiolcarbamate is triethyl ammonium N,N-di-n-propyl monothiolcarbamate.

References Cited

UNITED STATES PATENTS 2,820,024   1/1958   Van der Kerk _____ 260—77.5

HOSEA E. TAYLOR, Primary Examiner

H. S. COCKERAM, Assistant Examiner